United States Patent [19]
Tomatis

[11] Patent Number: 5,505,608
[45] Date of Patent: Apr. 9, 1996

[54] CHEESE MOULDING AND HARDENING APPARATUS, PARTICULARLY FOR PASTA FILATA CHEESE

[75] Inventor: Stefano Tomatis, Peveragno, Italy

[73] Assignee: CMT Costruzioni Meccaniche E Technologia S.p.A., Peveragno, Italy

[21] Appl. No.: 206,357

[22] Filed: Mar. 7, 1994

[30] Foreign Application Priority Data

Mar. 15, 1993 [IT] Italy .................. TO93A0171

[51] Int. Cl.⁶ .................. B29C 43/08; B29C 43/50
[52] U.S. Cl. .................. 425/261; 425/350; 425/351; 425/360; 425/444; 426/512
[58] Field of Search .................. 425/259, 344, 425/345, 347, 348 R, 351, 350, 444, 449, 236, 237, 235, 346, 359, 360, 258, 261; 426/512

[56] References Cited

U.S. PATENT DOCUMENTS

| | | | |
|---|---|---|---|
| 780,050 | 1/1905 | Marsh | 425/348 |
| 1,272,073 | 7/1918 | Majewski | 425/350 |
| 1,524,915 | 2/1925 | Debay | 425/360 |
| 1,931,759 | 10/1933 | Hasing | 425/237 |
| 2,052,061 | 8/1936 | Toelke | 425/360 |
| 2,656,797 | 10/1953 | Chambon | 425/350 |
| 3,137,029 | 6/1964 | Zolt | 425/360 |
| 4,616,988 | 10/1980 | Muzzarelli | 425/259 |

FOREIGN PATENT DOCUMENTS

| | | |
|---|---|---|
| 1966433 | 5/1973 | Germany . |
| 3616949 | 11/1986 | Germany . |
| 167768 | 11/1922 | United Kingdom .................. 425/350 |
| 8700002 | 1/1987 | WIPO . |

*Primary Examiner*—Khanh P. Nguyen
*Attorney, Agent, or Firm*—Guido Modiano; Albert Josif

[57] ABSTRACT

A frame (10) carries horizontal, parallel, journaled, cylindrical bearings (26, 28), upon which rotatably rests the cylindrical external surface a wheel (30) having, on its outside periphery, ports (44) communicating with respective moulds (45) which are radially arranged side by side in the wheel. Plungers (46) are slidably received in the moulds. Feeder (52) stationary with respect to the wheel (30) deliver pasta filata into at least one of the ports. Ejectors (48, 50) stationary with respect to the wheel (30) eject pasta filata from at least one of said moulds (45) through its associate port. A motor (42, 43) with transmission (38, 40, 41) moves said wheel (30) in steps corresponding to the interval between two successive ports along the periphery of the wheel. Jets (66) sprinkle the moulds with chilled water.

6 Claims, 2 Drawing Sheets

CHEESE MOULDING AND HARDENING APPARATUS, PARTICULARLY FOR PASTA FILATA CHEESE

BACKGROUND OF THE INVENTION

This invention is concerned with a cheese moulding and hardening apparatus. The invention is particularly applicable in the production of provolone, block-shaped mozzarella, and other pasta filata cheese, such as the one known in the art as "pizza cheese", but it could be applied in the production of other kinds of cheese, such as those known as "pecorino", "caciotta", Gouda, Edam, etc.

In the production of provolone or other similar cheese such as block-shaped mozzarella, "pizza cheese", etc., the pasta filata in a plastic condition is introduced into cylindrical or prismatic moulds; the moulds are then chilled to harden their pasta filata contents; finally, the hardened cheese is removed from the moulds.

In the past, the above operations were carried out by means of free moulds, which, after being filled with pasta filata, were immersed in chilled water in bulk, and had then to be taken out and manually emptied. In order to eliminate such manual work and automatize processing, U.S. Pat. No. 4,664,613 of May 12, 1987 provides a moulding and hardening machine where a large-diameter turning table or carousel, resting on a horizontal bedplate, carries a number of vertical moulds, arranged in several rows. The carousel moves in steps, and at each step a group of moulds is filled with pasta filata by feeder means. During the subsequent rotation of the carousel, the moulds are chilled by cold-water jets, and, after a full revolution, the blocks contained in the moulds are discharged.

The carousel of IT-A-1 183 842 has a typical diameter of 2 to 3 meters, which are compounded by accessory equipment surrounding the carousel. Therefore, that prior machine is quite large. Moreover, in order to rotatably support a table of such size and weight, expensive machining is necessary, as well as an extremely stiff, and therefore heavy and expensive, bedplate. Such high costs are reflected also in transport and installation.

SUMMARY OF THE INVENTION

Accordingly, the main object of the invention is to provide a cheese moulding and hardening apparatus, particularly for pasta filata cheese, having a similar performance to the above known machine, but a smaller size and cost.

The above object, as well as other objects and advantages such as will appear from the following disclosure, is achieved by the invention by means of a cheese moulding and hardening apparatus, particularly for pasta filata cheese, comprising:

a) a frame in which at least two horizontal, parallel, cylindrical bearings are journaled;

b) a wheel having at least one circular cylindrical external surface resting on said bearings and having on its outside periphery at least one row of ports communicating with respective moulds which are radially arranged side by side in the wheel;

c) feeder means, stationary with respect to the wheel, for delivering pasta filata in a plastic state into at least one of said ports;

d) ejector means stationary with respect to the wheel for ejecting pasta filata from at least one of said moulds through its associate port; and e) driving means for moving said wheel in steps corresponding to the interval between two successive ports along the periphery of the wheel.

BRIEF DESCRIPTION OF THE DRAWINGS

The invention will now be described in more detail, with reference to a preferred embodiment, given by way of illustration, and shown in the attached drawings, wherein.

DESCRIPTION OF PREFERRED EMBODIMENTS

Figure 1:
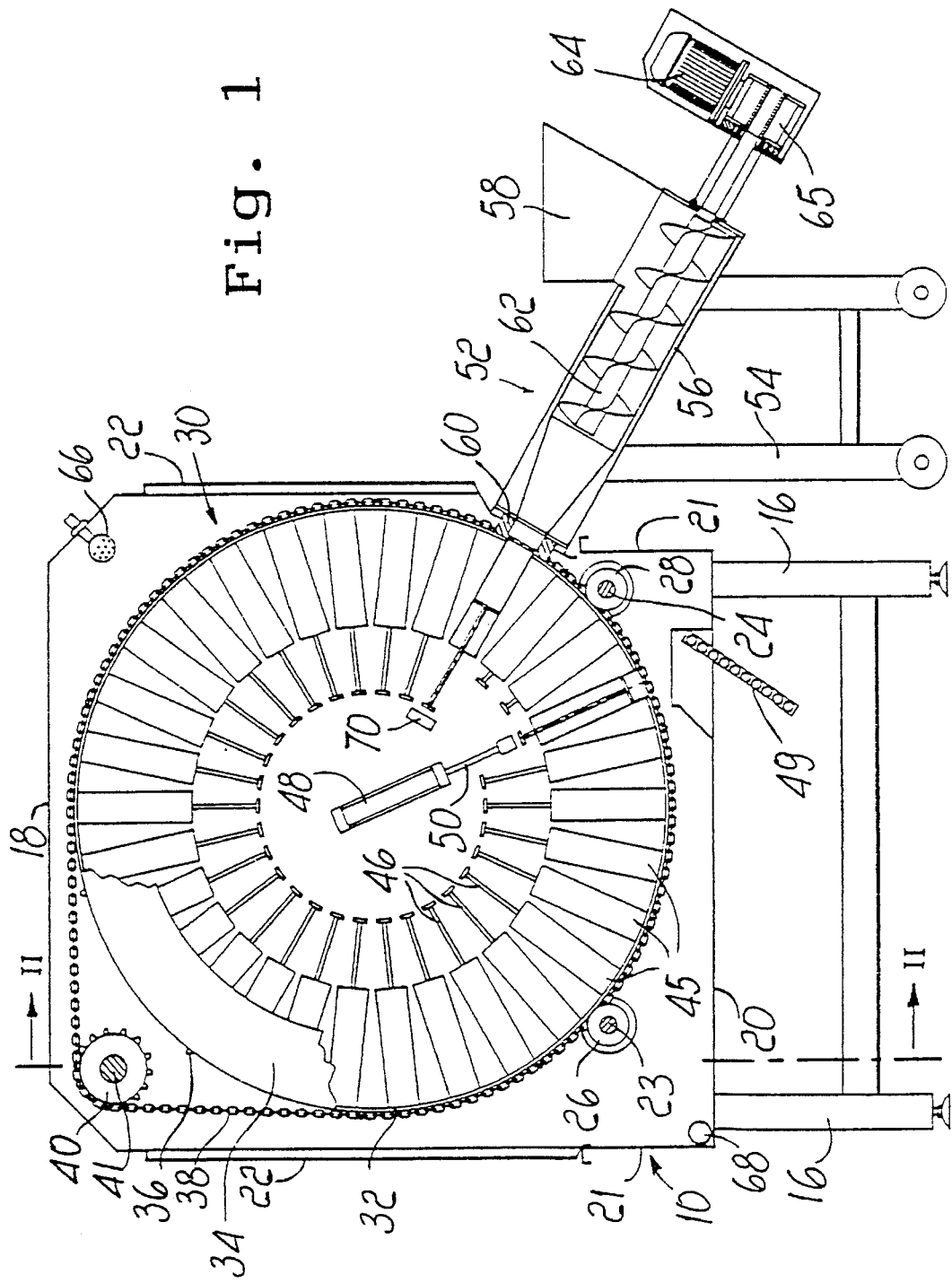
FIG. 1 is a side view, in cross-section, of a moulding and hardening apparatus according to a preferred embodiment of the invention.

With reference to the Figures, a frame 10 comprises two vertical parallel walls 12 and 14, mounted on uprights 16 and braced by upper, lower and lateral cross-plates 18, 20 and 21 to form an enclosed box having access doors such as 22. Between vertical walls 12 and 14 two parallel, horizontal shafts 23 and 24 rotatably support (preferably through ball or roller bearings not shown) respective pairs of flanged sleeves or rollers 26 and 28.

A wheel 30, comprising a cylindrical wall 32 provided with lateral annular braces such as 34, rests upon both pairs of rollers 26 and 28, so that it can turn by rolling upon them. A number of teeth or spurs 36, radially projecting from wheel 30, engage a chain 38 surrounding wheel 30 and driven by a sprocket 40 which is integral with a shaft 41. The latter is journaled on journal boxes such as 39, in a position parallel to the axis of wheel 30, and is driven by an electric motor 42 through a reduction gear 43 which is mounted on frame 10.

Figure 2:
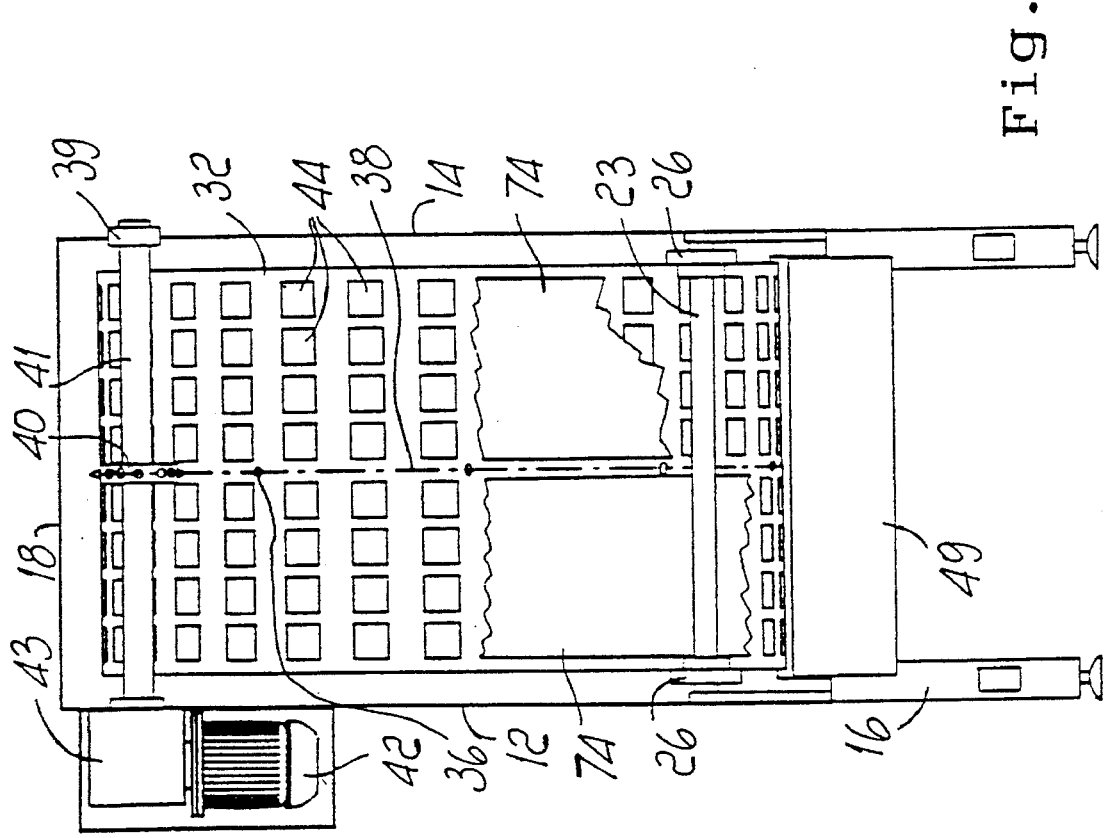
FIG. 2 is an end view of the same apparatus, in cross-section made on line II—II of FIG. 1.

Cylindrical wall 32 has a number of apertures or ports 44 (FIG. 2) which are aligned in straight rows, uniformly arranged along its periphery, and a number of radially arranged moulds 45 are attached to its inside surface. Each mould comprises a prismatic envelope with rectangular cross-section, opening to the outside through a respective port 44 in wall 32, and containing a respective, radially slidable plunger 46.

Within frame 10, and in a central position with respect to wheel 30, a set of ejector members is mounted, which comprise several pneumatic or hydraulic actuator cylinders 48, having rods 50 for radially pushing plungers 46 of respective moulds 45 to eject the blocks contained in the moulds (as will be further described below) and to cause them to drop on a roller chute 49 beneath.

A mobile pasta filata feeder 52 is associated with the above described apparatus. The feeder 52 comprises a truck 54 supporting several inclined conduits 56 (only one is visible in FIG. 1), which are provided with a loading hopper 52 and are tapered at their ends, leading into respective yielding fittings 60 which can be sealingly pressed against the ports of respective moulds 45. A respective auger 62 is rotatably arranged in each conduit 56 and is driven by an electric motor 64 through a reduction gear 65.

Jets of chilled water, shown as 66 by way of example, and well known in the art, are mounted on the inside walls of the enclosure forming frame 10, with the purpose of spraying wheel 30 and moulds 45 within it with chilled water. A draining hole 68 allows the water collecting on the bottom to flow out.

In operation, feeder 52 is placed as shown on FIG. 1 and is kept loaded with hot and plastic pasta filata through hopper 58, and, by means of the pressure generated by augers 62, pasta filata is delivered into the facing row of ports 44 and into corresponding moulds 45. Plungers 46 in said moulds move back until they trip a limit switch 70, as obvious for a person skilled in the art, to stop the feeding step. Wheel 30 now moves forward one step, driven by chain 38 from motor 42, so that a fresh row of moulds 45 is brought before feeder 52. The fresh row can therefore be filled by the feeder.

Each row of moulds, after filling, goes around in steps, while being sprayed with chilled water by jets 66. As the pasta filata cools down, it becomes increasinly firmer, and, after a full round, each row of moulds comes into alignment with ejector members 48, 50, the pasta filata within them being now substantially firm or hardened. The ejectors are then driven to push hardened blocks of mozzarella from corresponding moulds 45, through associated ports 44. The blocks fall on chute 49, to be led from there to a conveyor belt (not shown) or other conveyor means which carries the blocks to the next processing step, e.g. brining, packaging, etc.

Figure 3:
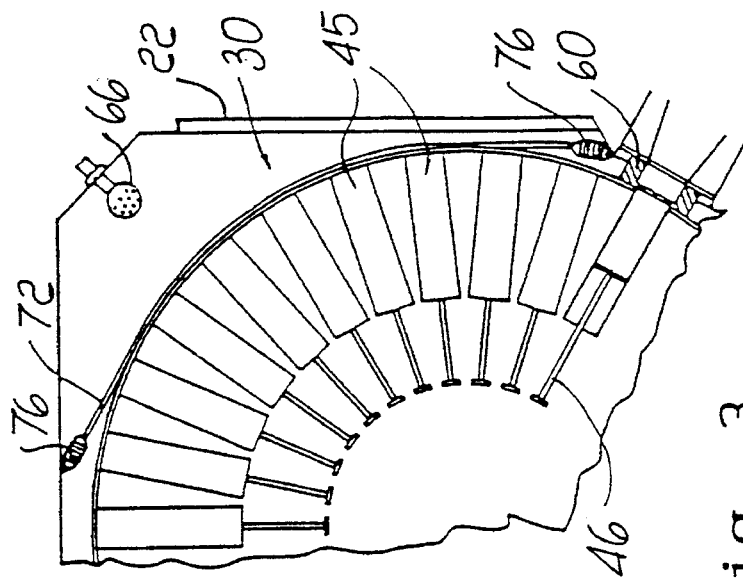
FIG. 3 is a view similar to FIG. 1, but showing the apparatus only partially, in order to show retaining belts which are not shown on FIG. 1 for the sake of clarity.

In order to prevent the pasta filata mass, when still in the plastic state, from flowing out of the moulds through their filling and emptying ports, the outside surface of the wheel is wrapped in retaining belts such as 72 (FIG. 3) in the portion immediately after the filling position, and preferably also 74 (FIG. 4) in the portion immediately preceding the ejection. In the intermediate portion which is not provided with a retaining belt, the ports are directed upwards, and gravity is sufficient to prevent the product from flowing out. Belts 72, 74 are hooked, at their respective ends, to suitable points of the frane, by means of elastic tensioners such as 76. The retaining belts are not shown in FIG. 1 to avoid confusion in the drawing.

The above described apparatus has a footprint much smaller than the machine of IT-A-1 183 842, for an equal number of moulds, mainly because one of its major dimensions now extends vertically rather than horizontally. Moreover, it is also less massive and heavy, because it does not require a broad, accurately ground supporting surface as in the prior patent. The only precision machining on an extended surface in the apparatus of this invention is the lathing required on the external periphery of the wheel, while the rollers and their journals are small and easy to manufacture.

In practice the operating steps of the apparatus will be controlled by an electronic or electromechanical programming unit, with the cooperation of limit switches and the like. These parts have not been shown in the drawings because they are beyond the scope of the invention, and are obvious for a person skilled in the art.

Cheese of a different type from pasta filata, such as pecorino, caciotta, edam and others, may require, rather than cooling, another kind of heat treatment. In this case, obviously, jets 66 can be supplied with water at a desired temperature, e.g. warm water, or may be replaced with other processing means, in accordance with the specific technology of the cheese to be produced.

Within the principle of the wheel with radial moulds open to the outside and with rolling support, many changes may be made to the apparatus described above. For instance, chain driving could be replaced with a direct engagement from the sprocket to a crown gear made integral with the periphery of wheel 30, or, alternatively, one or both the pairs of rollers could be replaced with driving pinions. Also, the retaining belts could be replaced with arched sections matching the external surface of the wheel and elastically biased against it. Moreover, the feeding of pasta filata, rather than taking place in an inclined direction from the bottom, could be made horizontally in a higher position, and in this case the retaining belts for the pasta filata could be wholly or partly dispensed with.

I claim:

1. A cheese moulding and hardening apparatus for pasta filata cheese, comprising:
   a) at least a pair of cylindrical rollers which are journaled on a frame for free rotation in respective parallel, horizontal positions;
   b) a wheel with horizontal axis, having at least one circular cylindrical external surface resting on said rollers and having ports on its outside periphery, said ports communicating with respective moulds which are radially arranged side by side within the wheel, in alignment with respective ones of said ports, and wherein respective plungers are slidably received;
   c) driving means for intermittently setting said wheel in rolling motion upon said rollers, so that, whenever the wheel is stopped, at least one port and its communicating mould are brought to a predetermined mould-feeding position and at least one different port and its communicating mould are brought to a predetermined mould-unloading position;
   d) stationary feeder means beside the external surface of the wheel and arranged for delivering pasta filata into any of said ports that are at said mould-feeding position while the wheel is stopped; and
   e) stationary ejector means comprising linear actuators arranged in a central position with respect to the wheel, and having respective rods which are radially movable to abut against the plungers of the respective moulds when located in said predetermined unloading position.

2. The apparatus of claim 1, wherein said predetermined unloading position is located at a point lower than the axis of the wheel.

3. The apparatus of claim 2, wherein beneath said predetermined unloading position an inclined chute is arranged for conveying the unloaded cheese blocks.

4. The apparatus of claim 1, wherein said wheel driving means comprises a toothed sprocket formed around the wheel, a chain angaging the toothed sprocket and motor means for driving the chain.

5. The apparatus of claim 1, wherein said feeder means comprise one auger feeder for each of said ports requiring feeding, the feeder having one end provided with an elastic fitting for coupling to the respective port.

6. The apparatus of claim 1, wherein the external surface at least of the wheel section immediately successive to the mould feeding position runs along a retaining belt is kept pressed against the wheel surface.

* * * * *